United States Patent [19]
Smith

[11] 3,779,080
[45] Dec. 18, 1973

[54] GAUGE RECORDING MAXIMUM PRESSURE

[75] Inventor: Charles Harry Smith, Glendale, Calif.

[73] Assignee: Purex Corporation, Ltd., Lakewood, Calif.

[22] Filed: July 26, 1971

[21] Appl. No.: 166,016

[52] U.S. Cl. .................................... 73/396, 116/70
[51] Int. Cl. ................................................. G01l 7/16
[58] Field of Search........................ 73/396; 116/70

[56] References Cited
UNITED STATES PATENTS

| | | | |
|---|---|---|---|
| 1,836,601 | 12/1931 | Key | 73/396 |
| 1,251,745 | 1/1918 | Bowers | 73/396 |
| 2,948,151 | 8/1960 | Astl | 73/396 X |

Primary Examiner—Richard C. Queisser
Assistant Examiner—Daniel M. Yasich
Attorney—White, Haefliger & Bachand

[57] ABSTRACT

Device for visual indication of a maximum fluid pressure condition reached during a given interval of time. Useful for the in-flight recording of fluid pressure condition e.g., in the reduction gear box of a jet engine where excessive pressures are indicative of incipient failures, the device comprises a body having a cavity in fluid pressure communication with system fluid, an indicator movable relative to the body cavity in response to changes in system fluid pressure, and locking means limiting indicator travel to a single direction indicative of a relatively higher pressure condition in the system.

7 Claims, 4 Drawing Figures

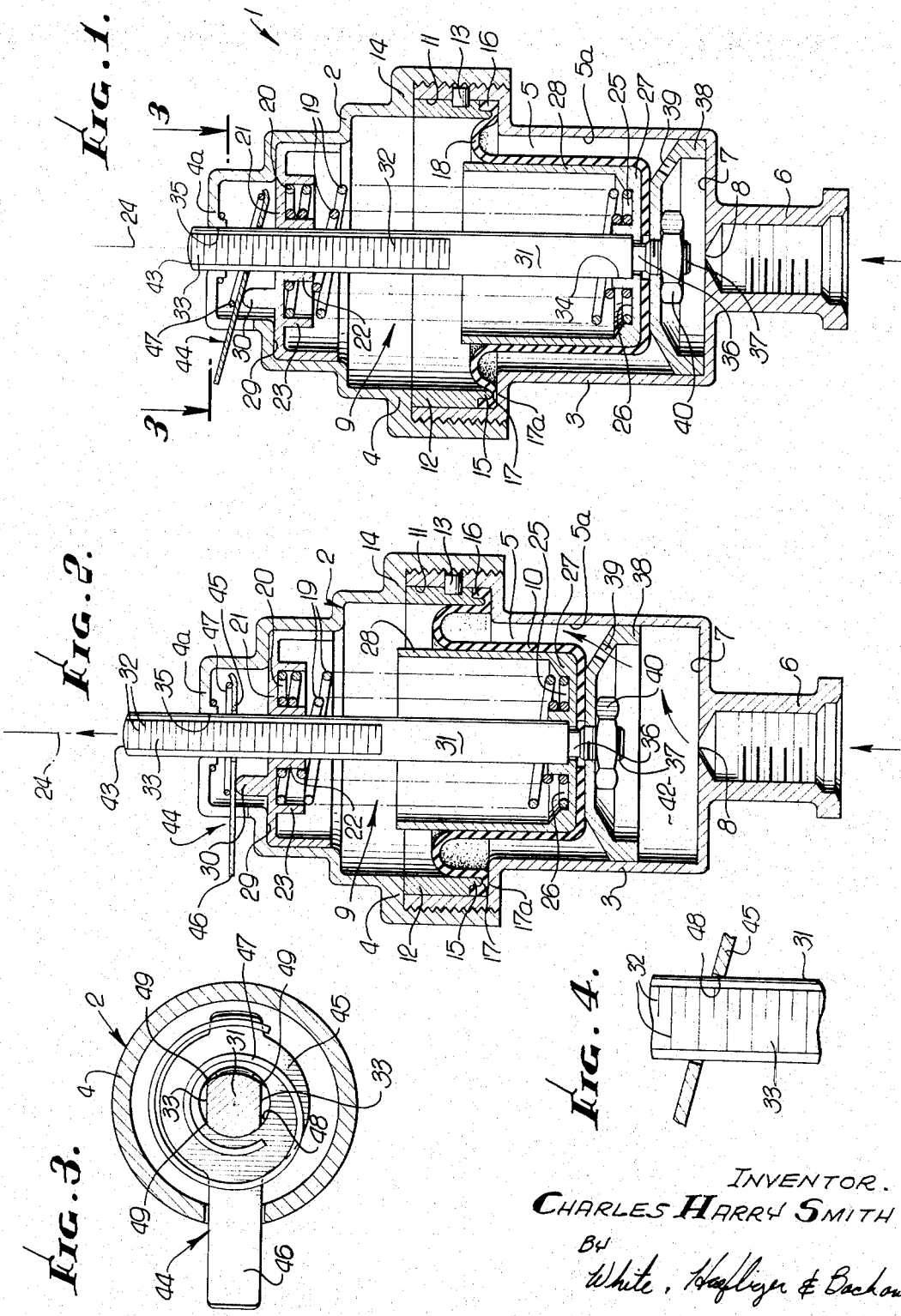

GAUGE RECORDING MAXIMUM PRESSURE

BACKGROUND OF THE INVENTION

This invention has to do with pressure recording devices. The invention is more particularly concerned with devices recording visually the maximum pressure history of a fluid containing system. The present device was occasioned by the need for accurately and simply monitoring jet engine pressure conditions, but it is applicable to other fluid pressure characterized environments.

In jet engines used in aircraft and in like turbine devices, various pumps and generators are run off the main drive shaft by means of a reduction gear train. The reduction gear drive may be located in an accessory gear box just behind the compressor and just ahead of the combustion chamber portion of the turbine. The box is sealed against undue pressure development therein which may lead to bearing failure. Because the seal failure is a prelude to bearing failure and much less costly to repair, it is highly desirable to monitor pressure within the accessory gearbox during flight. To successfully monitor this pressure, it is necessary to provide a monitoring device which is rugged in construction, accurate despite vibration and capable of ready visual presentation of maximum fluid pressures encountered during flight. In addition, the device must stably record maximum pressures encountered although the pressure may subsequently drop, as when the engines shut down after flight.

PRIOR ART

Numerous devices have been made available for recording fluid pressure conditions over time, but none is known to us providing the features of the present device. Devices specifically intended for jet engine accessory gear box use have lacked sufficient accuracy or durability in the vibration prone environment in which they are necessarily used.

SUMMARY OF THE INVENTION

It is a major objective of the present invention to provide a reliable, low cost, long wearing and accurate visual indicating device highly adapted to the monitoring of maximum pressure conditions over time or during a cycle.

In particular, the invention provides a device for indicating fluid pressure in a system experiencing varying conditions of pressure. The device comprises a pressure resistant body defining a cavity, port means through the body maintaining the body cavity in continuous fluid pressure communication with system fluid, an indicator movable relative to the body cavity in response to changes in system fluid pressure, and locking means limiting indicator travel to a single direction indicative of a relatively higher pressure condition in the system. The indicator may comprise a rod movable relative to the locking means. The locking means may include an element adapted to engage the rod, mounted to pass the rod moving relatively thereto in one direction responsive to relatively increased fluid pressure in the system and to lock the rod against movement in the reverse direction. The fluid pressure indicating device may further include piston means adapted to travel within the body cavity in response to fluid pressure changes within the cavity, the indicator being carried by the piston to be movable therewith. A flexible support may be provided for the piston in the cavity, defining a cavity wall and adapted to permit relative piston movement within the cavity.

In certain embodiments hereof, the device includes piston means movably supported within the cavity, e.g., by a diaphragm fluid tightly secured to the body cavity wall and extending transversely of the cavity, the diaphragm being centrally flexible to movably support the piston within the cavity. The indicator rod may be carried by the piston face remote to the system fluid in the cavity for longitudinal axial movement into and out of the cavity to variously project beyond the body. Indicator travel guide means may be provided comprising structure slidably engaging the cavity wall and adapted to move with the rod in guiding relation.

The locking member herein may comprise an element outside the cavity and extending transversely of the indicator rod longitudinal axis and having means cooperating with the indicator rod to selectively arrest rod movement dependent on direction of rod travel. In highly preferred embodiments, the locking member element has a ring portion encircling the indicator rod outward of the system fluid containing cavity, the ring being sized to pass the rod when the ring is angularly disposed normal to the rod longitudinal axis and to engage the rod when the ring is deflected from a normal disposition. Means may be provided to deflect the ring in response to movement of the rod toward the system fluid containing portion of the cavity including shoulder means adapted to engage the locking element in pivoting relation and deflect the ring portion of the element out of normal disposition relative to the rod, and a spring biasing the element into engagement with the shoulder means. The locking member element may include a finger engageable tab projecting from the ring portion thereof in engagement with the shoulder whereby the element is pivoted about the shoulder, to a normal disposition relative to the rod, the ring portion thereof being thereby releasable from engagement with the rod. The rod itself may be rectangular in cross-section to have sharply defined longitudinally extended corners and flats therebetween, the rod corners being adapted to engage the element ring portion in its deflected disposition.

BRIEF DESCRIPTION OF THE DRAWINGS

The invention will be further described as to an illustrative embodiment in conjunction with the attached drawing in which:

FIG. 1 is a medium longitudinal section of the device;

FIG. 2 is a view like FIG. 1, with the indicator rod undergoing pressure displacement;

FIG. 3 is a view in transverse section taken on line 3—3 in FIG. 1; and

FIG. 4 is a fragmentary detail view of the rod arresting element in binding engagement with the rod.

DESCRIPTION OF THE PREFERRED EMBODIMENTS

Referring to the drawings, in FIG. 1, the pressure indicator device 1 includes a body 2 formed of thread connected first and second oppositely cup-shaped portions 3 and 4 which define body cavity 5. The body cavity 5 openly communicates with a fluid pressure system (not shown), to be monitored, through fitting 6 projecting axially from first body portion 3, the fitting being adapted to thread onto a nipple means (not shown)

providing communication to the fluid pressure system. Base wall 7 of the body cavity is apertured at 8 to admit pressurized fluid into the body cavity 5.

Within the cavity 5, a fluid pressure responsive indicator assembly 9 is provided including a flexible diaphragm 10 perimetrically captured in annular body recess 11 in the body first portion 3 by ring 12 secured in the recess by pin 13 and urged into the recess by shoulder 14 on the second body portion 4. Ring 12 has a coaxial annular projection 15 which bears against the diaphragm 10 inward slightly of the actual diaphragm perimeter 16 to pinch the diaphragm at 17 against shoulder 17a as the first and second body portions are screwed together.

Diaphragm 10 is formed of rubber or other generally elastomeric, natural or synthetic, material or other sheet material capable of rolling on itself without cracking or breaking. The diaphragm 10 extends across the diameter of body cavity 5 and is shaped to have a variable heigh annular roll 18 formed therein. Dual coil springs 19 are provided between the diaphragm 10 and seat member 21 to damp out resonance. The upper end 20 of springs 19 engages seat member 21 between concentric inner and outer annular lips 22 and 23 respectively projects inwardly into the body cavity 5 coaxially with the cavity longitudinal axis 24. The opposite, lower ends 25 of spring 19 is seated against the bottom 26 of movable cup 27. The cup 27 is carried by the flexible central portion of diaphragm 10 as a piston for movement within the body cavity 5. Cup 27 has a wall portion 28 extending circularly about the spring 19 for a distance selected to normally limit travel of the cup and diaphragm within the body cavity to a predetermined range, by engagement with seat member 21 circumferentially of the outer annular lip 23. The seat member 21 is fixed in the second body portion 4 against shoulder 29. An eccentric boss 30 forms shoulder means on the seat member 21, on the opposite side thereof from the annular lips 22, 23, for purposes to be explained hereinbelow.

An indicator rod 31 is also included in the indicator assembly 9. The rod 31 may be rectangular in cross section and have graduated divisions 32 on rod flats 33 (FIG. 3). The indicator rod 31 is reduced at 36 to pass through opening 34 formed centrally of cup 27, and positioned coaxial with the body cavity 5 by guide structure 38, an inverted truncated cone apertured at 39 for system fluid passage into cavity 5 secured to rod 31 by nut 40 threaded onto enlarged rod end 37 to be movable with the cup carried by the diaphragm 10 as the semi-conical guide structure slides along the cavity wall 5a. The indicator rod 31 is sized to variously project axially through opening 35 in the top (leftmost) wall of second body portion 4 in response to the location of the cup 27 in the body cavity 5.

The diaphragm 10 is fluid tightly perimetrically secured to the cavity wall at recess 11 and rod 31 is sealed therein at opening 34 so that diaphragm 10 rsponses to fluid pressure in lower cavity portion 42 by movement upward (see FIG. 2) rolling on itself to vary the shape of diaphragm roll 18 and carrying the cup 27 and thus indicator rod 31 upward also, against the force of concentric springs 19, thereby increasing the projection 43 of the rod 31 beyond top wall a distance readily measured by consulting Jhe graduations 32 on the rod flats 33.

Of course, if the fluid pressure were to drop in the lower cavity portion 42 the diaphragm 10 would normally tend to retreat under the return pressure of springs 19. If this were to happen, the maximum pressure in the fluid system during a certain period would not be ascertainable after the fact, a condition which is unsatifactory in attempting to monitor in-flight conditions, after landing, in aircraft engine usage.

Accordingly, the invention provides means for arresting return movement of the rod 31 once advanced, but permitting further outward projection thereof should a greater overpressure occur. Referring first to FIG. 3, a key 44 is provided which closely encircles indicator rod 31 about flats 33. The key is a flat metal member outside of and above cavity 5 comprising a ring portion 45 and a tab 46 which projects laterally from the second body portion 4, a distance enabling easy finger manipulation thereof. A conical spring 47 is provided centered on rod 31 and between key 44 and top wall 4a of the second body portion. In addition, key 44 engages boss 30 which is located eccentrically within body portion 4 so as to pivot about the boss under the pressure of spring 47. In FIG. 2, the indicator assembly 9, comprising the center portion of diaphragm 10, cup 27 and rod 31 is advancing outwardly from the body under a greater fluid pressure in lower cavity portion 42 and ring 45 engagement with the rod, if any, tends to make the ring horizontal, or normal to the rod movement direction along the body cavity and rod axis 24 whereby the rod is disengaged and movement is relatively easy.

In FIG. 1, the condition of the key 44 when the pressure is lowered is shown. There retromovement of the rod 31 permits key ring 45 to pivot about boss 30 shoulder and become cocked relative to the rod. In the cocked condition of key 44 the horizontal opening 48 in key ring 45 is too small for rod 31 passage and the ring binds the rod, preferably by engagement of the rod corners 49 with the ring opening 48. See FIGS. 3 and 4. A subsequent increase in fluid pressure will free the rod 31 as any engagement tends to level the ring 45 and thus increase the through opening 48 for the rod.

Thus, maximum pressure for any period is registered. The device 1 may be restored to its original zero setting (FIG. 1) by finger depression of tab 46 to horizontally orient the key 44 and ring portion 45 thereof relative to rod 31, permitting springs 19 to return the rod to its nonpressured, withdrawn position.

I claim:

1. Device for indicating highest fluid pressure experienced over time in a system experiencing varying pressure conditions, comprising a pressure resistant body defining a body cavity and having a rod passing in the top wall portion of the device and communicating with said cavity and a boss on said top wall eccentric to said opening and port means communicating said cavity continuously with system fluid pressure, a piston mounted and sealed within the body cavity between said opening and said port means for fluid pressure responsive movement, an indicator rod carried by the piston for varying extension through said rod passing opening responsive to piston movement; and locking means limiting said indicator rod travel to one way movement responsive to a higher experienced pressure in the system comprising a locking member having a ring portion encircling the indicator rod, said boss defining a pivot shoulder to operatively coact with the locking member so that the member ring portion binds the indicator rod against return movement if the pressure drops below the highest experienced pressure in the system.

2. Fluid pressure indicating device according to claim 1 including also spring means resiliently biasing said member ring portion into engagement with said boss.

3. Fluid pressure indicating device according to claim 1 including also a piston support, said piston support comprising a diaphragm fluid tightly secured to the body cavity wall and extending transversely of the cavity, said diaphragm being centrally flexible for movably supporting the piston within said cavity.

4. Fluid pressure indicating device according to claim 3 in which said indicator rod is carried by the piston face remote to said cavity port and for longitudinal axial movement into and out of said cavity to variously project through said rod passing opening beyond the body.

5. Fluid pressure indicating device according to claim 4 including also indicator rod travel guide means comprising structure slidably engaging the cavity wall and adapted to move with the rod in guiding relation.

6. Fluid pressure indicating device accordng to claim 1 in which said rod is rectangular in cross section and has sharply defined longitudinally extended corners and flats therebetween.

7. Fluid pressure device according to claim 7 including also a finger engageable tab projecting from the ring portion of the locking member for pivoting said member about said boss to release the member ring portion from engagement with said rod.

* * * * *

UNITED STATES PATENT OFFICE
CERTIFICATE OF CORRECTION

Patent No. 3,779,080          Dated December 18, 1973

Inventor(s) Charles Harry Smith

It is certified that error appears in the above-identified patent and that said Letters Patent are hereby corrected as shown below:

Column 3, line 20; "variable heigh annular roll 18 formed therein. Dual coil" should read --variable height annular roll 18 formed therein. Dual coil--.

Column 3, line 60; "rsponses to fluid pressure in lower cavity portion 42 by" should read -- responds to fluid pressure in lower cavity portion 42 by--.

Column 3, line 66; "measured by consulting Jhe graduations 32 on the rod" should read --measured by consulting the graduations 32 on the rod--.

Column 4, line 52; "defining a body cavity and having a rod passing in the" should read --defining a body cavity and having a rod passing opening in the--.

Column 6, line 7; "6. Fluid pressure indicating device accordng to claim" should read --6. Fluid pressure indicating device according to claim--.

Column 6, line 11; "7. Fluid pressure device according to claim 7 includ-" should read --7. Fluid pressure device according to claim 6 includ- --.

Signed and sealed this 13th day of August 1974.

(SEAL)
Attest:

McCOY M. GIBSON, JR.          C. MARSHALL DANN
Attesting Officer             Commissioner of Patents